United States Patent
Iwafuchi et al.

(10) Patent No.: US 8,934,138 B2
(45) Date of Patent: Jan. 13, 2015

(54) COLOR PROCESSING APPARATUS AND METHOD, AND NON-TRANSITORY COMPUTER READABLE MEDIUM

(71) Applicant: Fuji Xerox Co., Ltd., Tokyo (JP)

(72) Inventors: Toshihiro Iwafuchi, Kanagawa (JP); Hidetoshi Kawashima, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 106 days.

(21) Appl. No.: 13/663,863

(22) Filed: Oct. 30, 2012

(65) Prior Publication Data

US 2013/0286413 A1    Oct. 31, 2013

(30) Foreign Application Priority Data

Apr. 25, 2012 (JP) ................................ 2012-100171

(51) Int. Cl.
*H04N 1/60* (2006.01)
*G06K 1/00* (2006.01)
*G06F 15/00* (2006.01)
*G06K 15/02* (2006.01)

(52) U.S. Cl.
CPC . *H04N 1/60* (2013.01); *G06K 15/02* (2013.01)
USPC ............................................ 358/1.9; 358/1.1

(58) Field of Classification Search
CPC ................................. H04N 1/60; G06K 15/02
USPC ...................................................... 358/1.9, 1.1
See application file for complete search history.

(56) References Cited

U.S. PATENT DOCUMENTS 8,223,410 B2 * 7/2012 Wakazono et al. ........... 358/518
8,446,634 B2 * 5/2013 Takenaka ....................... 358/1.9

FOREIGN PATENT DOCUMENTS

JP     A 2007-258835     10/2007
JP     A 2009-212642      9/2009

* cited by examiner

*Primary Examiner* — Douglas Tran
(74) *Attorney, Agent, or Firm* — Oliff PLC

(57) ABSTRACT

A color processing apparatus includes a correction unit. When, among colors on a color gamut boundary from a lowest-lightness color on an achromatic color axis to a highest-chroma color in a predetermined color space in an output color gamut of an output device in the color space, there exist a high-lightness color whose lightness is higher than that of the highest-chroma color and a color with the same lightness as that of the high-lightness color but with different chroma, and when there exists a low-lightness color whose lightness is lower than that of the lowest-lightness color on the achromatic color axis in the color space, the correction units corrects the low-lightness color to a higher lightness side higher than that of the lowest-lightness color on the achromatic color axis.

10 Claims, 9 Drawing Sheets

$$\Delta E = \sqrt{((L^*out - L^*in) \times WL)^2 + ((a^*out - a^*in) \times Wa)^2 + ((b^*out - b^*in) \times Wb)^2}$$

COLOR PROCESSING APPARATUS AND METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-100171 filed Apr. 25, 2012.

BACKGROUND

Technical Field

The present invention relates to a color processing apparatus and method, and to a non-transitory computer readable medium.

SUMMARY

According to an aspect of the invention, there is provided a color processing apparatus including a correction unit. Among colors on a color gamut boundary from a lowest-lightness color on an achromatic color axis to a highest-chroma color in a predetermined color space in an output color gamut of an output device in the color space, when there exist a high-lightness color whose lightness is higher than that of the highest-chroma color and a color with the same lightness as that of the high-lightness color but with different chroma, and when there exists a low-lightness color whose lightness is lower than that of the lowest-lightness color on the achromatic color axis in the color space, the correction unit corrects the low-lightness color to a higher lightness side higher than that of the lowest-lightness color on the achromatic color axis.

BRIEF DESCRIPTION OF THE DRAWINGS

An exemplary embodiment of the present invention will be described in detail based on the following figures, wherein.

DETAILED DESCRIPTION

Figure 1:
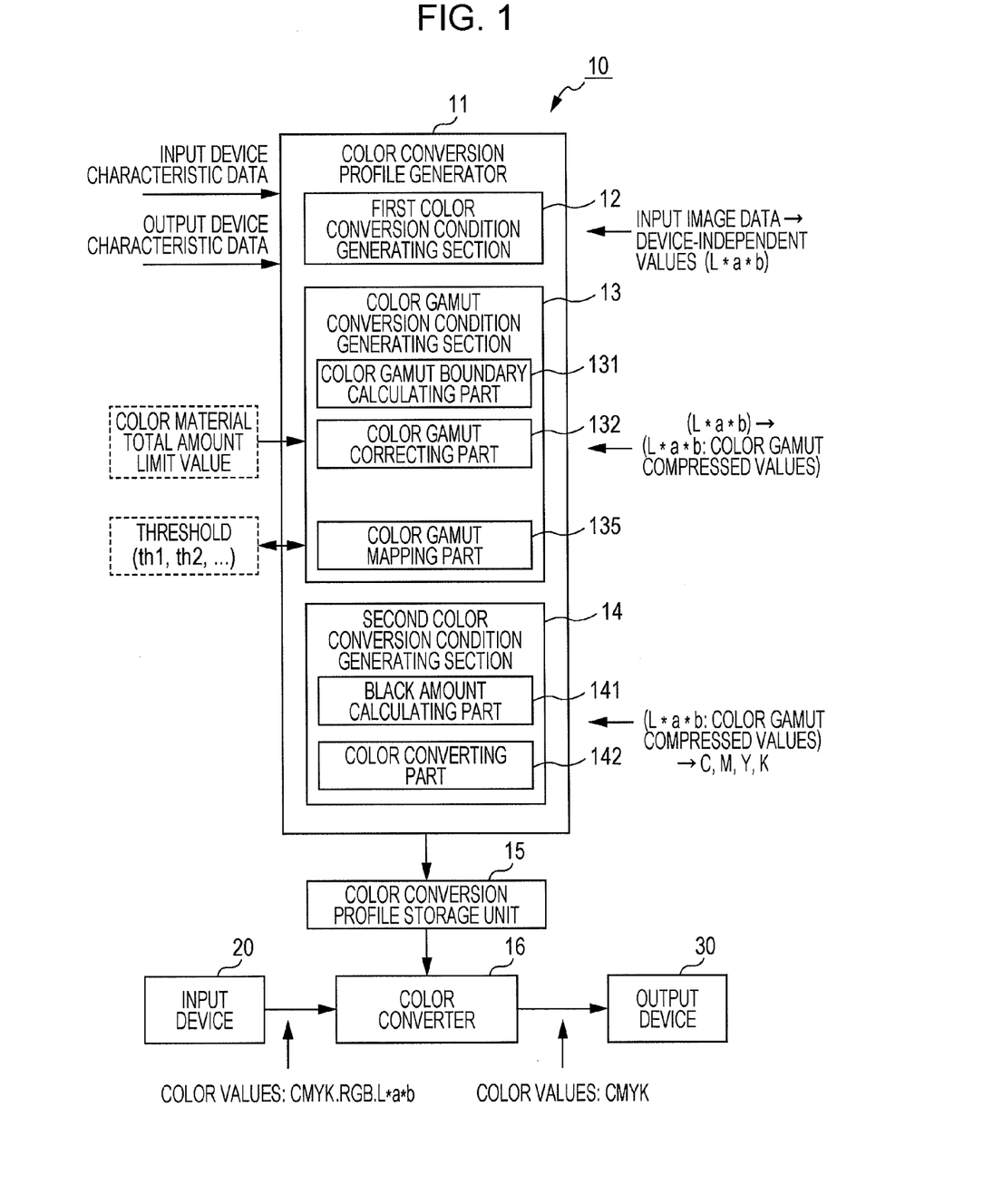
FIG. 1 is a functional block diagram of a color processing apparatus.

FIG. 1 is a block diagram illustrating the functional configuration of a color processing apparatus 10 according to an exemplary embodiment.

The color processing apparatus 10 includes a color converter 16, a color conversion profile storage unit 15, and a color conversion profile generator 11. The color converter 16 is provided between an input device 20 and an output device 30. The color converter 16 performs color conversion processing of image data input from the input device 20. The color conversion profile storage unit 15 stores a reference table (color conversion profile) to which the color converter 16 refers upon color conversion of image data. The color conversion profile generator 11 generates a color conversion profile stored in the color conversion profile storage unit 15.

The color processing apparatus 10 is realized by being included in an image forming apparatus (color copy machine), which is the output device 30, and which forms, for example, a color image with an electrophotographic system using cyan, magenta, yellow, and key (black) (CMYK) color toners and transfers and fixes the color image on a sheet.

The input device 20 may be, for example, an information processing terminal (client) realized using a personal computer (PC) or the like, or an image forming apparatus (color copy machine) that has a color gamut different from that of the output device 30.

When the input device 20 is the above-described client, image data in the red, green, and blue (RGB) color space, which is generated by a user who checks the colors on a display of the client, is input as a target of color gamut conversion to the color converter 16. Alternatively, when the input device 20 is another image forming apparatus, the image forming apparatus inputs image data in the CMYK color space as a target of color gamut conversion to the color converter 16.

In the color processing apparatus 10, the color conversion profile generator 11 includes a first color conversion condition generating section 12, a color gamut conversion condition generating section 13, and a second color conversion condition generating section 14. The first color conversion condition generating section 12 converts color values (such as R, G, and B) of image data input from the input device 20 into color values in a device-independent color space (such as the L*a*b space) that does not depend on the output device 30, which reproduces multiple colors based on multiple color (C, M, Y, and K colors in this example) elements. The color gamut conversion condition generating section 13 converts the color values of the input image data, which have been obtained as a result of conversion by the first color conversion condition generating section 12, into color values in the output color gamut of the output device 30, in the same color space (the L*a*b space). The second color conversion condition generating section 14 converts the color values in the L*a*b space, which have been obtained as a result of conversion by the color gamut conversion condition generating section 13, into color values in, for example, the CMYK color space, which are reproducible by the output device 30.

In a color conversion profile generating process, the color conversion profile generator 11 obtains input device characteristic data and output device characteristic data via, for example, a network. The input device characteristic data includes information necessary for calculating the boundary of a reproducible color gamut (input color gamut) in the above-described device-independent color space of the input device 20. The output device characteristic data includes information necessary for calculating the boundary of a reproducible color gamut (output color gamut) in the above-described device-independent color space of the output device 30.

In the color conversion profile generator 11, the color gamut conversion condition generating section 13 includes a color gamut boundary calculating part 131, a color gamut correcting part 132, and a color gamut mapping part 135. The color gamut boundary calculating part 131 calculates the boundary of the input color gamut of the input device 20 on the basis of the input device characteristic data, and calculates the boundary of the output color gamut of the output device 30 on the basis of the output device characteristic data. The color gamut correcting part 132 corrects the color gamut boundary of the output color gamut, which will be described in detail later. The color gamut mapping part 135 converts (maps) color values of all pixels in the input color gamut into color values in the output color gamut.

Further in the color conversion profile generator 11, the second color conversion condition generating section 14 includes a black amount calculating part 141, and a color converting part 142. The black amount calculating part 141 calculates the black amount from, for example, a color material total amount limit value set in advance (or stored in a memory or the like) in the output device 30. The color converting part 142 converts the color values mapped, by the color gamut mapping part 135 in the color gamut conversion condition generating section 13, to the output color gamut of the output device 30 into values in the CMYK color space of the output device 30 by reflecting the black amount calculated by the black amount calculating part 141.

Although the term "black" includes the meaning "the color of the 100%-black color material", the term "black" in the exemplary embodiment means "a color with the lowest lightness reproducible by the output device 30 on the cross-section of the color gamut" on the "cross-section of the color gamut of the output device 30" described later.

FIGS. 2A to 2E are conceptual diagrams illustrating images of color gamut conversion processing based on the color material total amount limit value of the output device 30 in the color processing apparatus 10 (see FIG. 1).

Figure 2A:
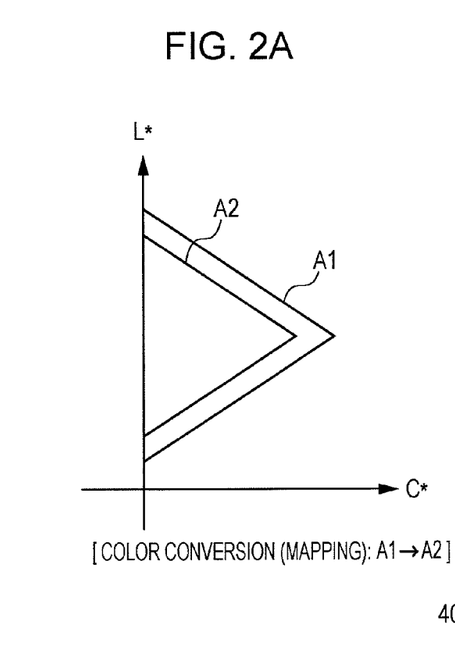
FIGS. 2A to 2E are image diagrams for describing color gamut conversion processing.

FIG. 2A illustrates the cross-sections of the color gamuts (cross-sections in terms of the L*C* side) of the color gamut boundary (input color gamut) of the input device 20 and the color gamut boundary (output color gamut) of the output device 30 in the L*a*b space, which are calculated by the color conversion profile generator 11 in the color gamut conversion processing.

Figure 2B:
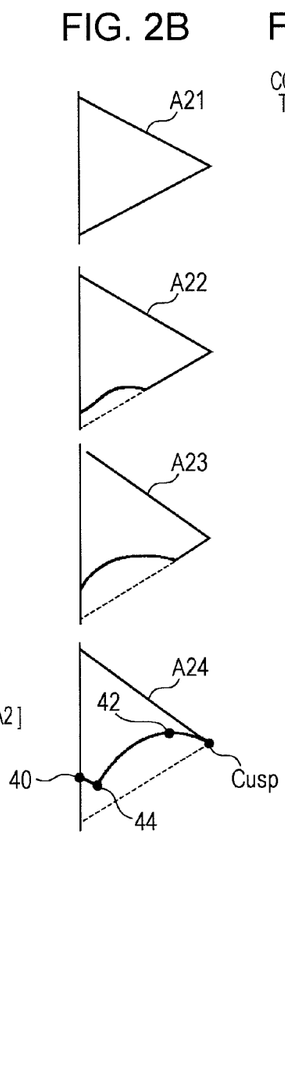
Figure 2C:
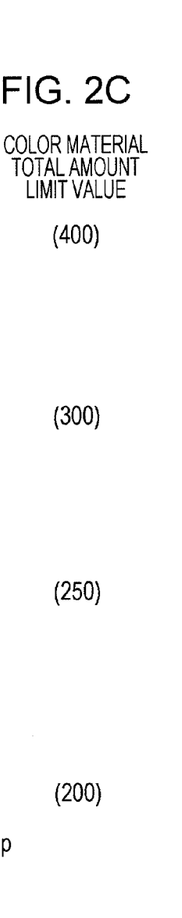

As illustrated in FIG. 2A, in the color conversion processing of converting a color in an input color gamut A1 reproducible in the color space of the input device 20 into a color in an output color gamut A2 reproducible in the color space of the output device 30, regarding a pixel region on a side extending from Cusp (vertex) on the cross-section of the color gamut of the output device 30 toward black, there is a characteristic that the shape of the color gamut boundary fluctuates in accordance with the color material total amount limit value of the output device 30 (see FIG. 2C), as in output color gamuts A21, A22, A23, and A24 illustrated in FIG. 2B.

That is, for example, when 100% of all the C, M, Y, and K colors are usable, the color material total amount limit value becomes 400. In such a case, as indicated by the output color gamut A21 illustrated in FIG. 2B, the boundary shape of the output color gamut A2 does not change. As the color material total amount limit value becomes smaller than 400, the shape of the boundary in a region on the low lightness side is gradually sharpened toward the high lightness side. Therefore, for example, as indicated by the color gamut A24 illustrated in FIG. 2B, among colors on the color gamut boundary from a lowest-lightness color 40 (lowest-chroma color) on the L*-axis of the output color gamut A24 to Cusp (the highest-chroma color on the cross-section of the color gamut), there may exist a high-lightness color 42 whose lightness is higher than the lightness of Cusp and a color with the same lightness as the high-lightness color 42 but with different chroma, and there may exist a low-lightness color 44 whose lightness is lower than that of the lowest-lightness color 40 on the L*-axis.

When such lightness inversion is occurring, if color gamut mapping is done without correcting the color gamut boundary from the lowest-lightness color 40 on the L*-axis to the high-lightness color 42 whose lightness is higher than the lightness of Cusp, gradation level differences may occur in a low-lightness region.

To this end, in the exemplary embodiment, when such lightness inversion described as above is occurring, the color gamut correcting part 132 corrects the color gamut boundary by correcting colors from the lowest-lightness color 40 on the L*-axis to the high-lightness color 42 whose lightness is higher than the lightness of Cusp toward a high lightness side, thereby avoiding the low-lightness color 44 whose lightness is lower than that of the lowest-lightness color 40 on the L*-axis.

Next, as the operation of the exemplary embodiment, a color conversion condition generating process will be described with reference to the flowchart illustrated in FIG. 3.

Figure 3:
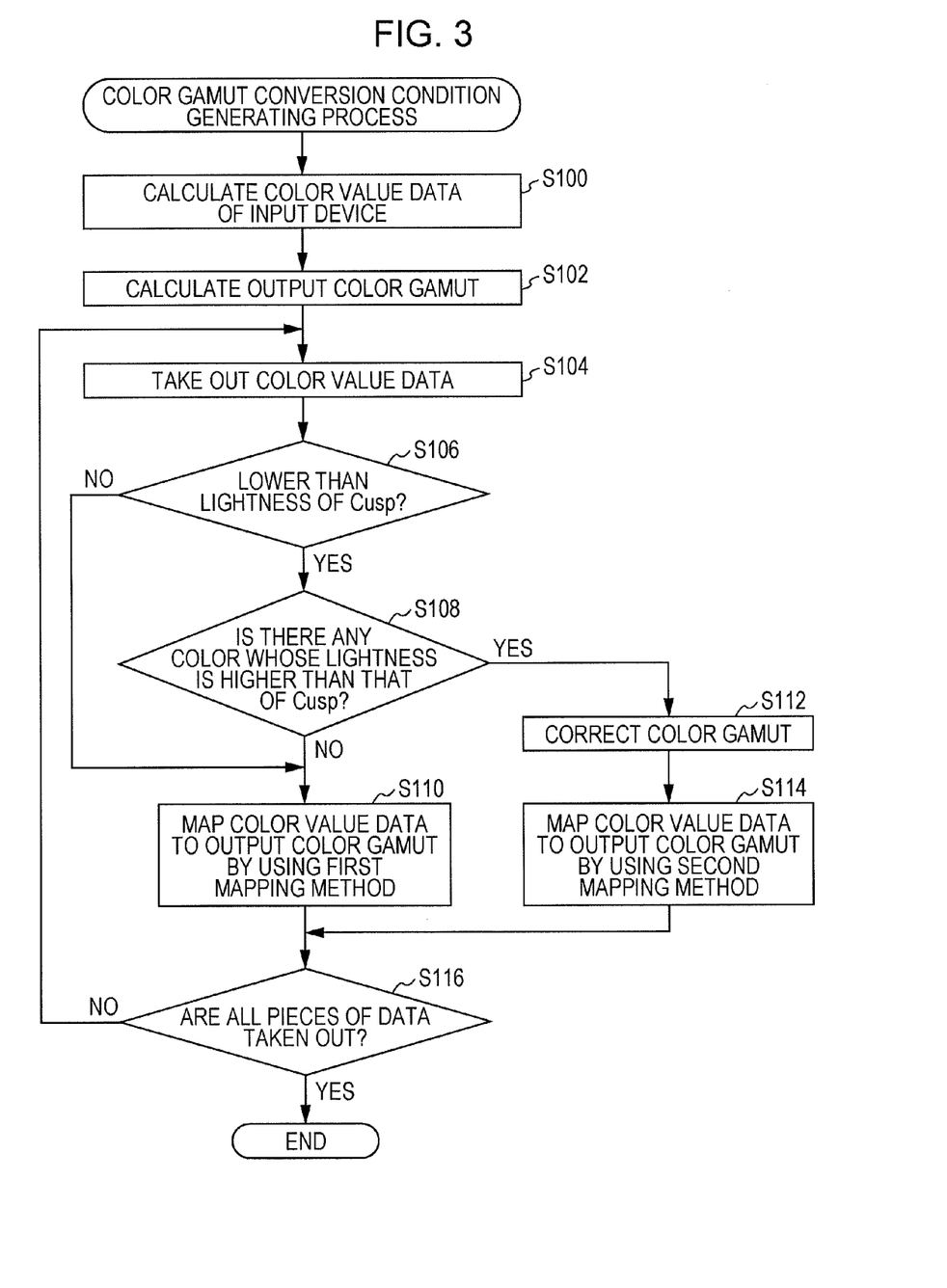
FIG. 3 is a flowchart illustrating a color gamut conversion condition generating process.

As illustrated in FIG. 3, the color gamut conversion condition generating section 13 loads input device characteristic data and output device characteristic data. On the basis of the input device characteristic data, the color gamut conversion condition generating section 13 calculates pixels (color value data) reproducible by the input device 20 (step S100). On the basis of the output device characteristic data, the color gamut conversion condition generating section 13 calculates the color gamut boundary (output color gamut) reproducible by the output device 30 (step S102).

Next, pixels corresponding to the processing order (counted by, for example, a pixel counter) are taken out one at a time from among all the pixels in the input color gamut, which are image data serving as a target of color gamut conversion (step S104). A color gamut conversion process (steps S106 to S116) of converting each such pixel into values in the output color gamut is executed.

In this color gamut conversion (mapping) process, it is determined whether the lightness of the taken-out pixel (color value data) is lower than the lightness of Cusp on the cross-section of the color gamut of the output device 30 (step S106). When the lightness of this pixel is not lower than the lightness of Cusp (NO in step S106), the color value data is mapped within the range of the output color gamut by using a first mapping method (step S110).

Accordingly, while it is determined in step S116 that mapping of all the pieces of pixel data has not been completed (NO in step S116), all the pixels in a region where the lightness is not lower than that of Cusp are continuously mapped by using the first mapping method.

When the lightness of the pixel taken out in step S104 is determined to be lower than the lightness of Cusp on the cross-section of the color gamut of the output device 30 (YES in step S106), the color gamut conversion condition generating section 13 determines whether there exists a high-lightness color whose lightness is higher than the lightness of Cusp and a color with the same lightness as that of the high-lightness color but with different chroma, among colors on the color gamut boundary, from the lowest-lightness color on the L*-axis to Cusp (highest-chroma color) on the cross-section of the color gamut of the output device 30 (step S108).

Here, among the colors on the color gamut boundary, from the lowest-lightness color on the L*-axis to Cusp on the cross-section of the color gamut of the output device 30, when it is determined that there do not exist a high-lightness color whose lightness is higher than the lightness of Cusp and a color with the same lightness as that of the high-lightness color but with different chroma (NO in step S108), the color value data of the pixel taken out in step S104 is mapped within the output color gamut by using the first mapping method (step S110).

In contrast, among the colors on the color gamut boundary, from the lowest-lightness color on the L*-axis to Cusp on the cross-section of the color gamut of the output device 30, when it is determined that there exist a high-lightness color whose lightness is higher than the lightness of Cusp and a color with the same lightness as that of the high-lightness color but with different chroma (YES in step S108), if there exists a color whose lightness is lower than that of the lowest-lightness color on the L*-axis of the cross-section of the color gamut of the output device 30, the color gamut correcting part 132 corrects the color gamut boundary by correcting the colors, from the lowest-lightness color on the L*-axis to the high-lightness color whose lightness is higher than Cusp, toward a high lightness side (S112).

Figure 4:
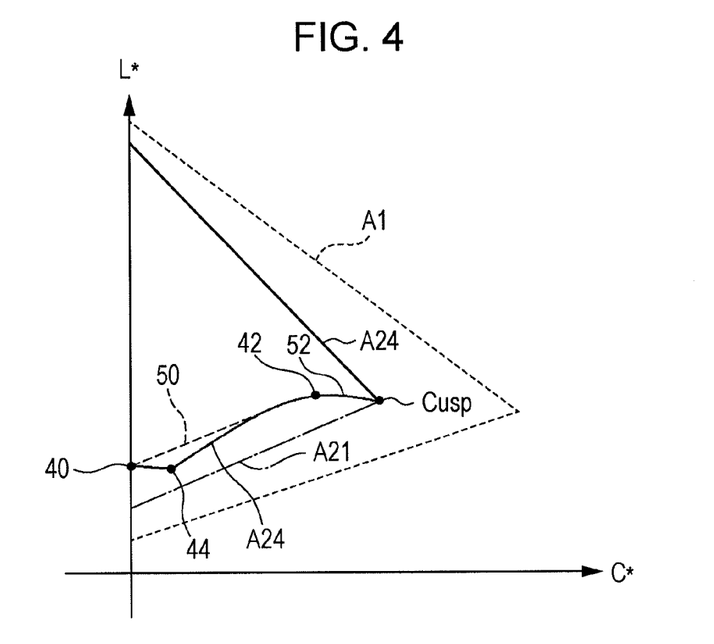
FIG. 4 is a diagram for describing color gamut correction.

For example, as illustrated in FIG. 4, a correction line 50 connecting, with a straight line, the lowest-lightness color 40 on the L*-axis and the highest-lightness color 42 among colors with lightness higher than that of Cusp, and a line 52 connecting the highest-lightness color 42 and Cusp serve as a new color gamut boundary. Accordingly, the lightness of the colors from the lowest-lightness color 40 on the L*-axis to the highest-lightness color 42 gradually increases, and hence, there exists no color whose lightness is lower than that of the lowest-lightness color 40 on the L*-axis.

Alternatively, instead of connecting the lowest-lightness color 40 on the L*-axis and the high-lightness color 42 with a straight line, spline interpolation may be implemented among three points including these two points and Cusp, thereby connecting these three points with a curved line.

Figure 5:
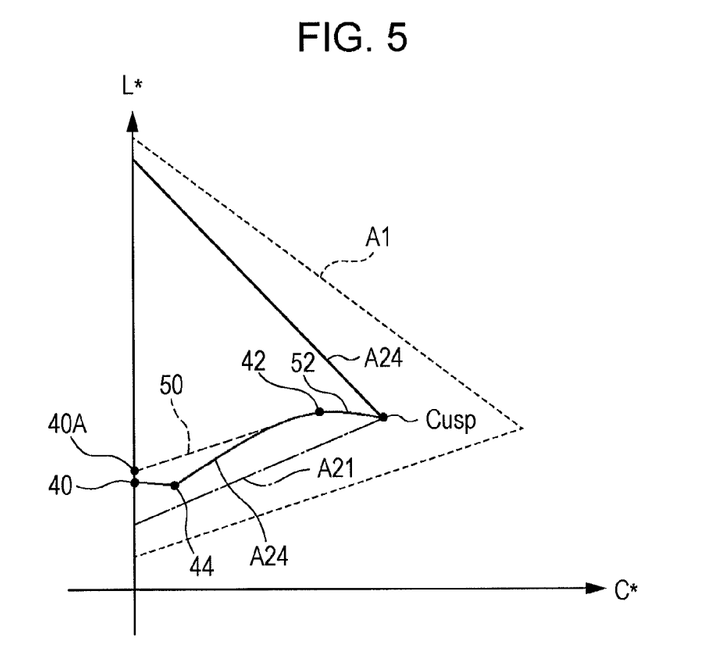
FIG. 5 is a diagram for describing color gamut correction.
Figure 6:
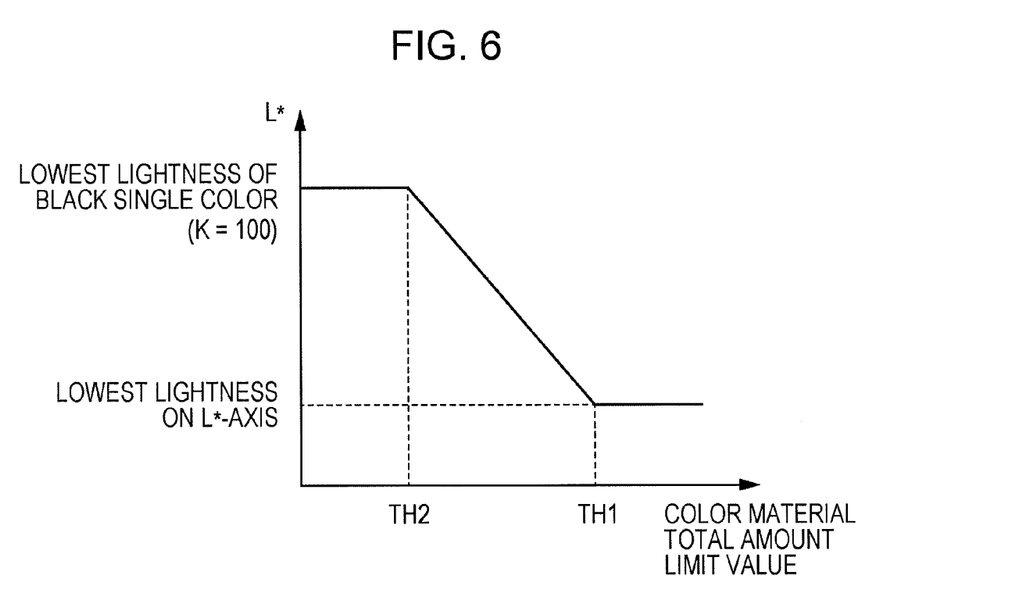
FIG. 6 is a diagram illustrating the relationship between a color material total amount limit value and the lowest lightness.

In FIG. 4, the lowest-lightness color 40 on the L*-axis is not corrected. Alternatively, as illustrated in FIG. 5, the lowest-lightness color 40 on the L*-axis may be corrected to a color 40A toward a higher lightness side in accordance with the color material total amount limit value. For example, as illustrated in FIG. 6, when the color material total amount limit value is greater than or equal to a threshold Th1 (e.g., 300%), the lightness of the lowest-lightness color 40 on the L*-axis substantially coincides with the lowest lightness of the color gamut of the output device 30. Thus, the lowest-lightness color 40 on the L*-axis is not corrected and remains as it is.

When the color material total amount limit value is greater than a threshold Th2 (e.g., 200%) and is less than the threshold Th1, the lowest-lightness color 40 on the L*-axis is corrected to become gradually higher as the color material total amount limit value becomes smaller. When the color material total amount limit value is less than or equal to the threshold Th2, the lightness of the lowest-lightness color 40 on the L*-axis is corrected to the lowest lightness of the black (K) single color (K=100%). As above, the lightness of the lowest-lightness color 40 on the L*-axis is corrected, with the lowest lightness of the black (K) single color as the upper limit.

Figure 7:
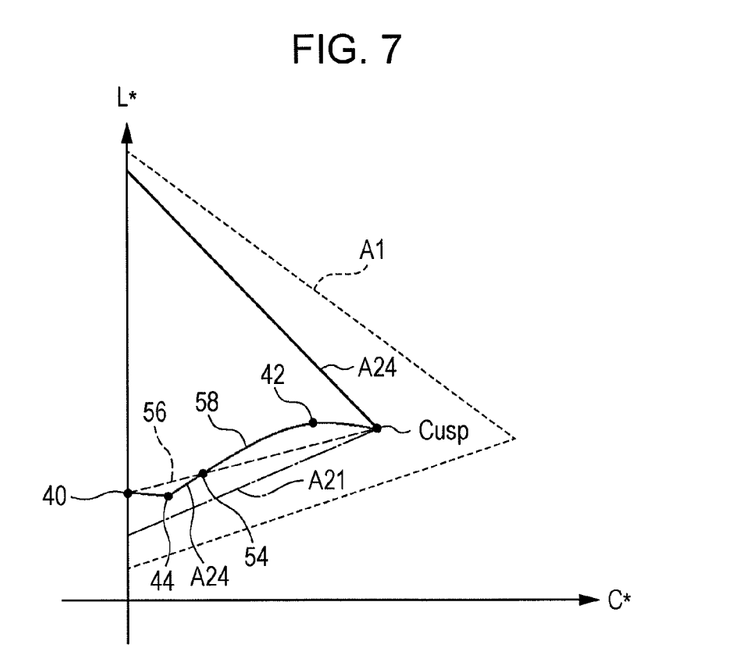
FIG. 7 is a diagram for describing color gamut correction.

As illustrated in FIG. 7, an intersection point 54 of the line connecting the lowest-lightness color 40 on the L*-axis and Cusp and the color gamut boundary A2 is obtained, and a line 56 from the lowest-lightness color 40 on the L*-axis to the intersection point 54 and a line 58 from the intersection point 54 to Cusp may serve as a new color gamut boundary.

Also in this case, on the basis of the relationship between the color material total amount limit value and L* illustrated in FIG. 6, the lowest-lightness color 40 on the L*-axis may be corrected to a higher lightness side in accordance with the color material total amount limit value.

After the color gamut has been corrected as above, the color value of the pixel taken out in step S104 is mapped by using a second mapping method, which is different from the first mapping method (step S114).

When it is determined that mapping processing of all the pieces of pixel data has been completed (YES in step S116), the above-described mapping process ends.

To change the mapping method from the first mapping method to the second mapping method in step S114, there is a method of changing a color difference equation, a method of correcting a weight coefficient of a corresponding color component in the color difference equation, or the like.

Figure 8:
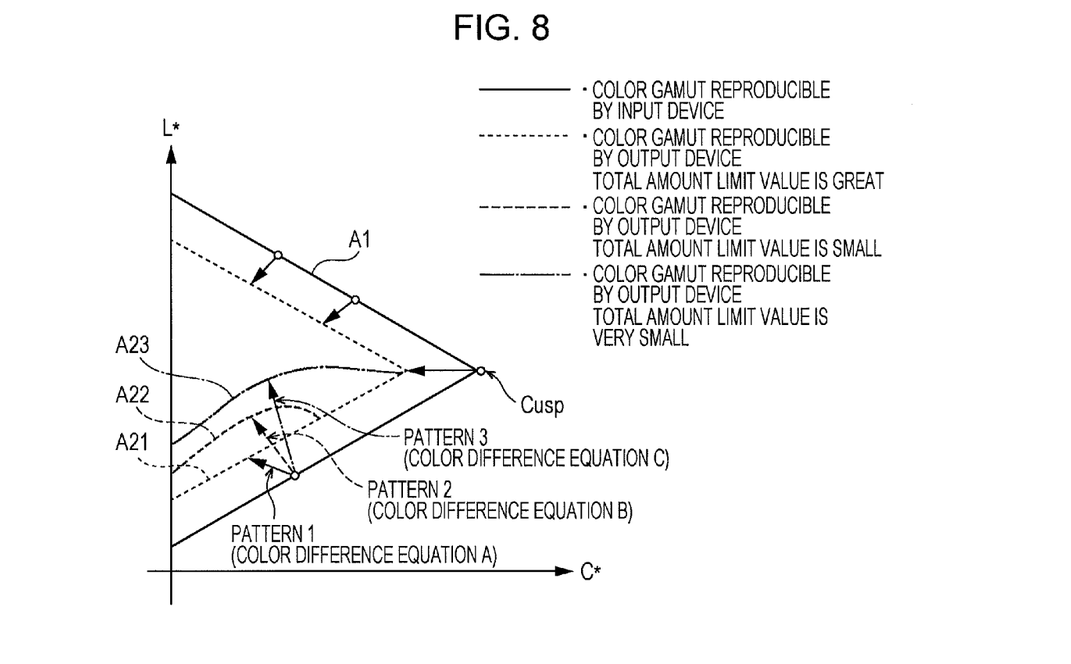
FIG. 8 is an image diagram for describing color gamut conversion processing.

FIG. 8 is a conceptual diagram (cross-section of the color gamut) illustrating color conversion method changing patterns related to the color conversion processing (see FIG. 3) in the exemplary embodiment. In particular, a method of changing the color difference equation to A, B, or C, as patterns 1, 2, and 3, is illustrated by way of example.

As illustrated in FIG. 8, in the exemplary embodiment, when the input color gamut boundary is A1, with regard to mapping processing of the color value data on a higher lightness side higher than the lightness of the vertex on the cross-section of the output color gamut in step S110, mapping is done using an existing method (e.g., the color difference equation A), regardless of the color material total amount limit value.

Figure 2D:
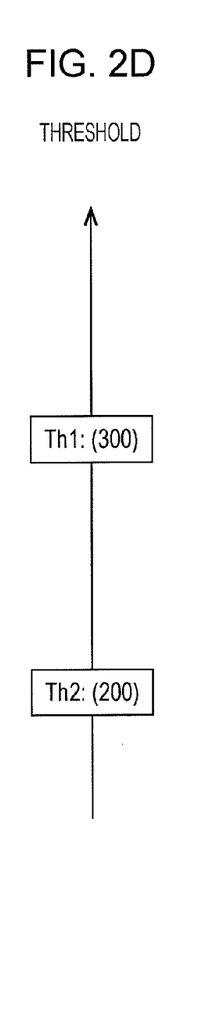
Figure 2E:
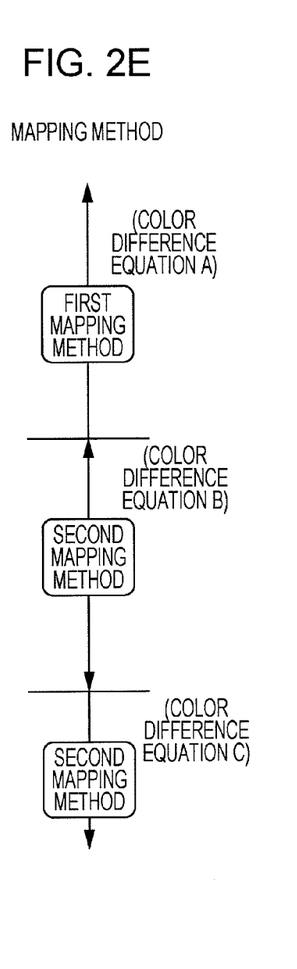

Even when the lightness of the color value data is lower than the lightness of the above-described vertex, if the color material total amount limit value of the output device 30 is great (such as when the color material total amount limit value is "300", which is greater than or equal to the maximum threshold Th1 in FIG. 2D), in step S110, mapping processing is done using the color difference equation A so as to minimize the color difference before and after the conversion.

Mapping processing to minimize the color difference will be described in detail later with reference to FIG. 9.

In contrast, when the color material total amount limit value of the output device 30 is less than "300" (such as when the color material total amount limit value is "250", which is less than the maximum threshold Th1 in FIG. 2D), in step S114, the color gamut mapping part 135 changes the color difference equation from the color difference equation A to, for example, the color difference equation B, and performs mapping processing by using the color difference equation B so as to minimize the color difference.

Here, the color difference equation B enables color reproduction that maintains chroma, compared with the color difference equation A.

When the color material total amount limit value of the output device 30 is yet smaller than "250" (such as when the color material total amount limit value is "200", which is less than or equal to the threshold Th2 in FIG. 2D), in step S114, the color difference equation A is changed to, for example, the color difference equation C, and mapping processing is done by using the color difference equation C so as to minimize the color difference.

Here, the color difference equation C enables color reproduction that maintains chroma, compared with the color difference equation B.

As above, in the exemplary embodiment, the color conversion method in a region where lightness is lower than that of the vertex on the cross-section of the color gamut of the input device 20 is changed in accordance with the color material total amount limit value (color material total amount) of the output device 30 so that chroma may be maintained as the color material total amount limit value becomes smaller.

In FIG. 8, an example has been described in which the color difference equation is changed (selected) so as to maintain characteristics that the chroma may be maintained as the color material total amount limit value (color material total amount) becomes smaller. Alternatively, another method is conceivable, which corrects the weight coefficient of a corresponding color component of the same color difference equation and changes the degree of maintaining chroma.

For example, chroma maintaining control in the case where the color difference equation [CIE1976] is used will be described.

In the exemplary embodiment, this color difference equation is used to find a mapping point where the color difference is minimized in the above-described step S110, S114, or the like.

In the color difference equation [CIE1976], the color difference [ΔE] is given by the following equation:

$$\Delta E = \{((L^*\text{out}-L^*\text{in}) \times WL)^2 + ((a^*\text{out}-a^*\text{in}) \times Wa)^2 + ((b^*\text{out}-b^*\text{in}) \times Wb)^2\}^{1/2} \quad (1)$$

Here, WL indicates a weight value (weight coefficient) of the L* component, and Wa and Wb indicate weight values of the a* component and the b* component, respectively.

Figure 9:
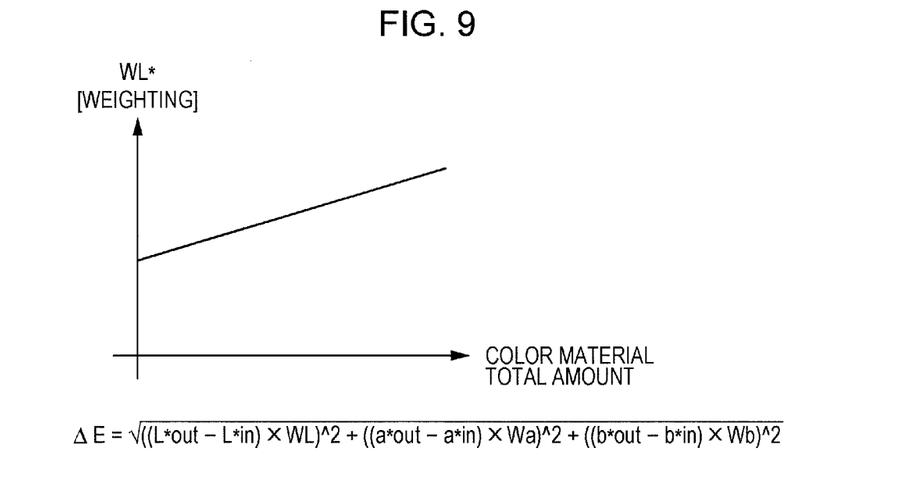
FIG. 9 is a diagram illustrating the corresponding relationship between the weight of a chroma component and the color material total amount.

In the exemplary embodiment, in control of changing the mapping method based on the color material total amount limit value, the weight values of the color difference equation are changed so that the relationship between WL* and the color material total amount becomes, for example, characteristics illustrated in FIG. 9.

That is, in the exemplary embodiment, as illustrated in FIG. 9, control is performed to reduce the weight value of WL* as the color material total amount becomes smaller. As WL* becomes smaller, the color difference equation has a stronger emphasis on chroma, resulting in realizing compression with a stronger emphasis on chroma.

In the exemplary embodiment, besides the method of changing the color difference equation (see patterns 1, 2, and 3 in FIG. 8) or the method of changing the weight values of the color difference equation (see FIG. 9), a method of handling lightness inversion or chroma inversion by changing an anchor point (AP), the center point of search, of mapping anchor is conceivable.

Figure 10A:
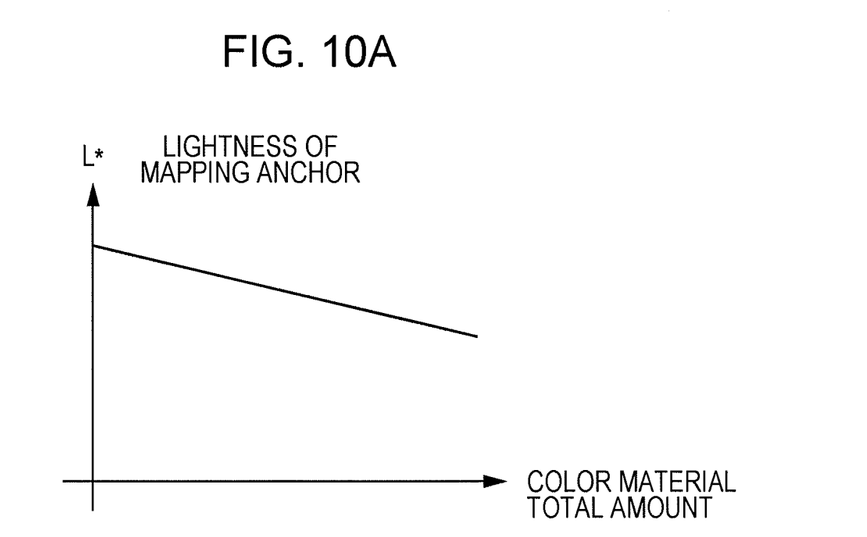
FIG. 10A is a diagram illustrating the corresponding relationship between the lightness of mapping anchor and the color material total amount.
Figure 10B:
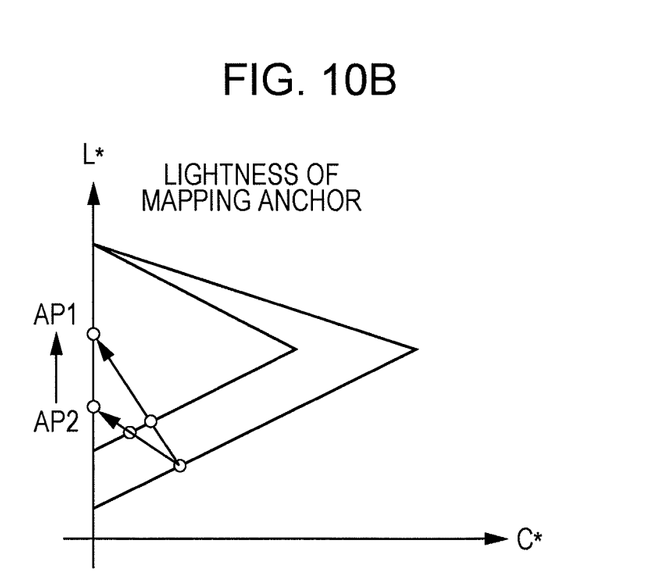
FIG. 10B is a diagram for describing a change in an anchor point.

Referring now to FIGS. 10A and 10B, examples of selecting the AP related to mapping processing in the exemplary embodiment will be described.

FIG. 10A illustrates the relationship between the lightness of mapping anchor related to mapping processing in the exemplary embodiment and the color material total amount (characteristics on the cross-section of the color gamut in the L*C* color space).

That is, in the exemplary embodiment, control is performed to increase the lightness of the mapping anchor as the color material total amount becomes smaller, in accordance with the characteristic diagram illustrated in FIG. 10A.

FIG. 10B is a diagram illustrating a transition state of the lightness of the mapping anchor on the cross-section of the light gamut (L*C* space).

According to FIG. 10B, on the cross-section of the color gamut, as the lightness of the mapping anchor becomes higher (as the lightness changes from AP2 to AP1), mapping has a stronger emphasis on maintaining chroma.

Thus, in the exemplary embodiment, control to increase the lightness of the mapping anchor as the color material total amount becomes smaller enables mapping that maintains chroma as the color material total amount becomes smaller.

Instead of directly mapping a color in the input color gamut to a color in the corrected output color gamut, stepwise color gamut mapping may be performed. For example, as illustrated in FIG. 11, a color 60 in the input color gamut may be mapped to a color 62 in the color gamut A21 in the case where the color material total amount limit value is 400% (that is, color materials of all the C, M, Y, and K are 100% usable) by using, for example, the first color gamut mapping method, and then the color 62 may be mapped to, for example, a color 64 in the corrected output color gamut.

Figure 12:
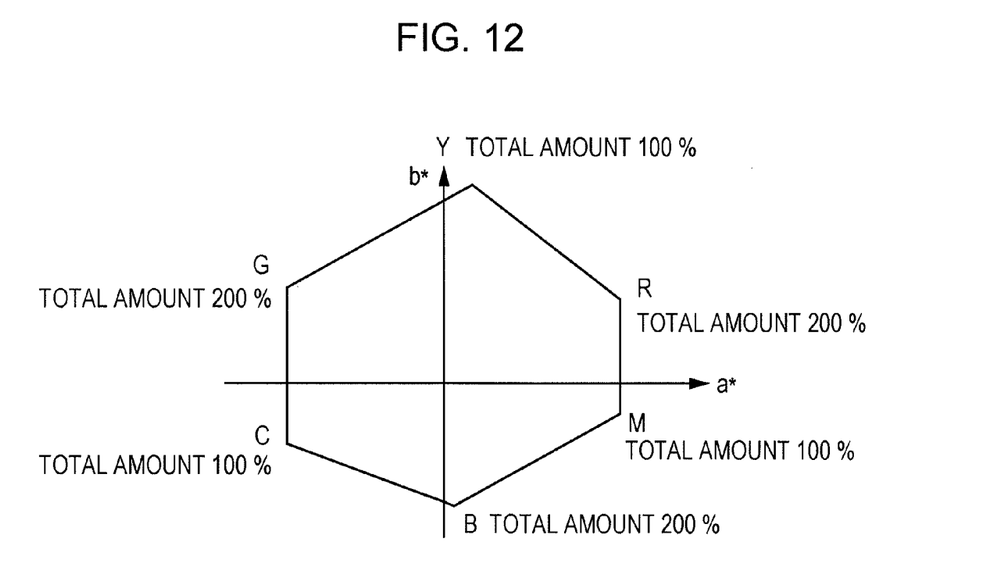
FIG. 12 is a diagram for describing the color material total amount of primary colors and secondary colors.

Alternatively, the color gamut mapping method may be changed in accordance with the color material total amount of Cusp. For example, as illustrated in FIG. 12, the maximum value of the color material total amount of Cusp of each of the primary colors, that is, Y, M, and C, is 100%; and the maximum value of the color material total amount of Cusp of each of the secondary colors, that is, R, G, and B, is 200%.

Figure 13:
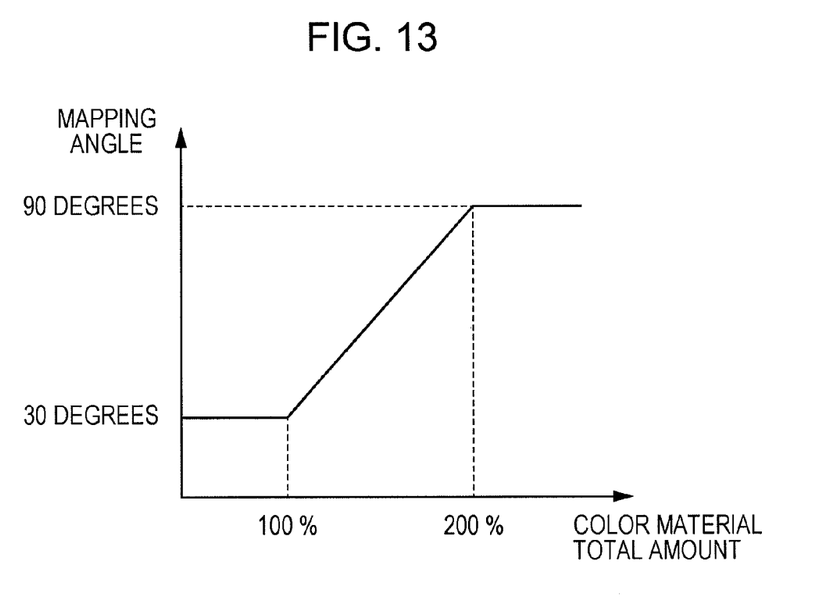
FIG. 13 is a diagram illustrating the corresponding relationship between a mapping angle and the color material total amount.

As illustrated in FIG. 13, when the color material total amount of Cusp is greater than or equal to 200%, color gamut mapping is done so that the mapping angle of the color gamut mapping (angle formed by the C*-axis and the mapping direction) becomes, for example, 90 degrees, that is, the chroma is maintained. In contrast, when the color material total amount of Cusp is less than or equal to 100%, color gamut mapping is done so that the mapping angle of the color gamut mapping becomes, for example, 30 degrees, that is, the lightness is maintained. Further, when the color material total amount of Cusp is greater than or equal to 100% and less than 200%, color gamut mapping is done so that the mapping angle gradually increases within the range from 30 degrees to 90 degrees as the color material total amount increases. That is, color gamut mapping is done so that the emphasis changes from maintaining lightness to maintaining chroma as the color material total amount increases.

Figure 11:
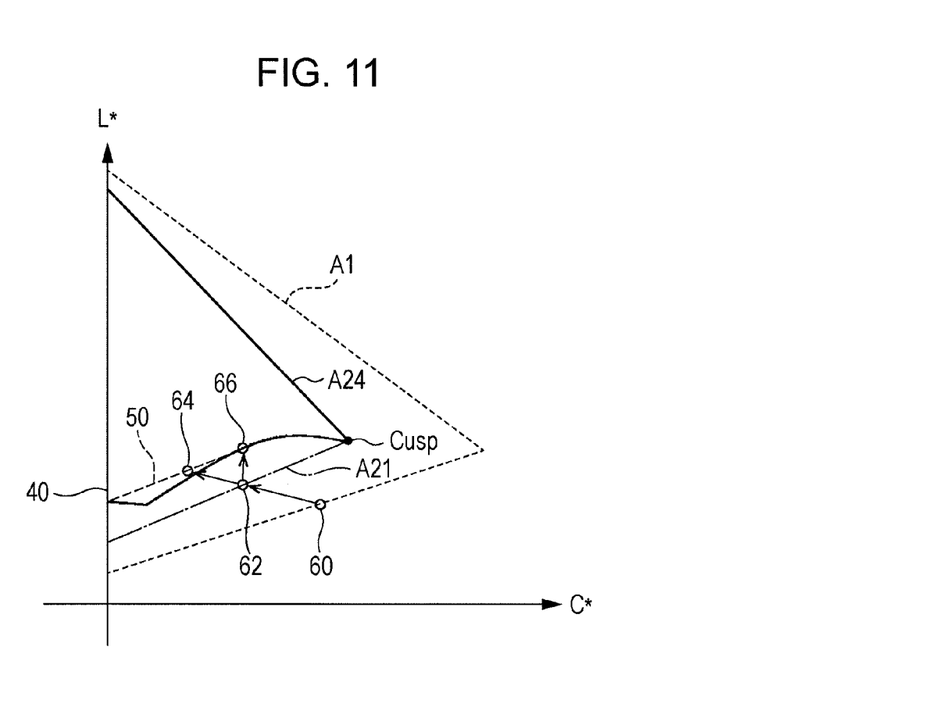
FIG. 11 is a diagram for describing color gamut mapping.

Accordingly, as illustrated in FIG. 11, when stepwise color gamut mapping is done, for example, if the color material total amount of Cusp is 200% (in the case of R, G, and B), the color 60 is mapped to the color 62 in the color gamut A21 where the color material total amount is 400%. Then, the color 62 is mapped to a color 66 in the corrected output color gamut with an angle of 90 degrees with respect to the C*-axis. In contrast, if the color material total amount of Cusp is 100% (in the case of Y, M, and C), the color 60 is mapped to the color 62 in the color gamut A21 where the color material total amount is 400%, and then the color 62 is mapped to the color 64 in the corrected output color gamut with an angle of 30 degrees with respect to the C*-axis.

In the exemplary embodiment, the case has been described in which color gamut mapping is performed after the mapping method is changed in step S114 from the first mapping method to the second mapping method. Alternatively, step S114 may be omitted, and, even when the color gamut is corrected in step S112, color gamut mapping may be done by using the first mapping method.

In the exemplary embodiment, the case has been described in which the exemplary embodiment is applied to a printer using an electrophotographic system. Alternatively, the exemplary embodiment is also applicable to an inkjet printer. In the case of an inkjet printer capable of ejecting multiple types of ink droplets, such as large, medium, and small droplets, when the lowest-lightness color 40 on the L*-axis is to be corrected, the color material total amount limit value is divided into three regions, namely, large, medium, and small regions, in accordance with the types of ink droplets. When the color material total amount limit value falls in the small region, the lightness of a small ink droplet of the 100% K single color serves as the upper limit. When the color material total amount limit value falls in the medium region, the lightness of a medium ink droplet of the 100% K single color serves as the upper limit. When the color material total amount limit value falls in the large region, the lightness of a large ink droplet of the 100% K single color serves as the upper limit. Then, the lightness of the lowest-lightness color 40 on the L*-axis may be corrected.

Figure 14:
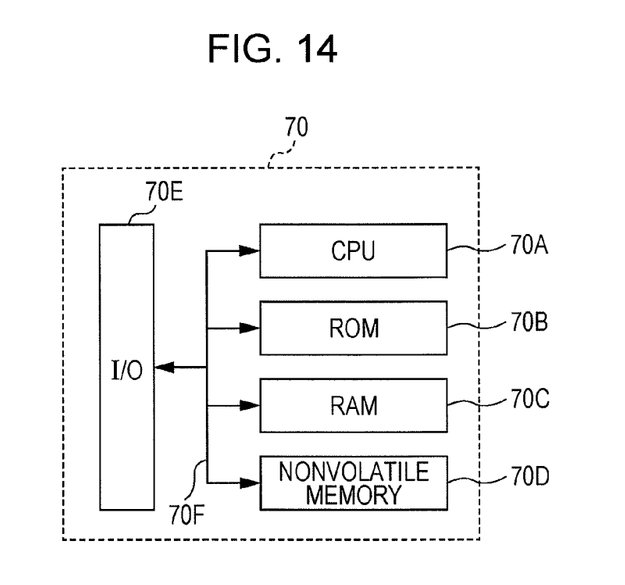
FIG. 14 is a block diagram of a color processing apparatus configured using a computer.

The color processing apparatus 10 is realized as a configuration including a computer 70 illustrated in FIG. 14. The computer 70 illustrated in FIG. 14 includes a central processing unit (CPU) 70A, a read-only memory (ROM) 70B, a random-access memory (RAM) 70C, a nonvolatile memory 70D, and an input/output (I/O) interface 70E, which are interconnected via a bus 70F. In this case, a program causing the computer 70 to execute the color gamut conversion condition generating process, illustrated in FIG. 3, is written to, for example, the nonvolatile memory 70D, and the CPU 70A is caused to execute the program. In this way, the computer 70 functions as the color processing apparatus 10. Alternatively, the program may be provided via a recording medium, such as a compact-disc read-only memory (CD-ROM) or a digital versatile disc read-only memory (DVD-ROM).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color processing apparatus comprising:
an output device with an output color gamut on a color boundary in a redetermined color space in a color space; and
a correction unit that corrects a low-lightness color to a higher lightness side higher than that of a lowest-lightness color on an achromatic color axis when (1) there exists, among colors on a color gamut boundary from the lowest-lightness color on the achromatic color axis to a highest-chroma color in the output color gamut, a high-lightness color whose lightness is higher than that of a highest-chroma color and a color with a same lightness as that of the high-lightness color but with a different chroma, and (2) there exists a low-lightness color whose lightness is lower than that of the lowest-lightness color on the achromatic color axis in the color space.

2. The color processing apparatus according to claim 1, wherein the correction unit corrects the low-lightness color to the higher lightness side so that the lightness of the colors on the color gamut boundary, from the lowest-lightness color on the achromatic color axis to the high-lightness color, gradually increases.

3. The color processing apparatus according to claim 1, wherein the correction unit corrects the low-lightness color to the higher lightness side so that chroma is maintained before and after the correction, as a color material total amount limit value of a color material output from the output device becomes smaller.

4. The color processing apparatus according to claim 2, wherein the correction unit corrects the low-lightness color to the higher lightness side so that chroma is maintained before and after the correction, as a color material total amount limit value of a color material output from the output device becomes smaller.

5. The color processing apparatus according to claim 1, wherein the correction unit corrects the lowest-lightness color on the achromatic color axis to have lightness lower than or equal to lightness reproducible with a black single color.

6. The color processing apparatus according to claim 1, wherein the correction unit corrects the lightness of the colors from the lowest-lightness color on the achromatic color axis to the high-lightness color whose lightness is higher than that of the highest-chroma color.

7. The color processing apparatus according to claim 1, further comprising a color gamut mapping unit that performs, in color gamut mapping of a color in an input color gamut in the color space of an input device to a color in the corrected output color gamut, color gamut mapping with a mapping angle that maintains chroma as a color material total amount of the highest-chroma color becomes greater.

8. The color processing apparatus according to claim 1, wherein the correction unit obtains an intersection point of a line connecting the lowest-lightness color on the achromatic color axis and the highest-chroma color and the color gamut boundary, and a line from the lowest-lightness color on the achromatic color axis to the intersection point and a line from the intersection point to the highest-chroma line serve as a new color gamut boundary.

9. A non-transitory computer readable medium storing a program causing a computer to execute a process, the process comprising:
calculating an output color gamut on a color boundary in a redetermined color space in a color space; and
correcting a low-lightness color to a higher lightness side higher than that of a lowest-lightness color on an achromatic color axis when 1 there exists among colors on a color gamut boundary from the lowest-lightness color on the achromatic color axis to a highest-chroma color in the output color gamut a high-lightness color whose lightness is higher than that of a highest-chroma color and a color with a same lightness as that of the high-lightness color but with a different chroma, and (2) there exists a low-lightness color whose lightness is lower than that of the lowest-lightness color on the achromatic color axis in the color space.

10. A color processing method comprising:
calculating an output color gamut on a color boundary in a predetermined color space in a color space; and
correcting a low-lightness color to a higher lightness side higher than that of a lowest-lightness color on an achromatic color axis when (1) there exists, among colors on a color gamut boundary from the lowest-lightness color on the achromatic color axis to a highest-chroma color in the output color gamut, a high-lightness color whose lightness is higher than that of a highest-chroma color and a color with a same lightness as that of the high-lightness color but with a different chroma, and (2) there exists a low-lightness color whose lightness is lower than that of the lowest-lightness color on the achromatic color axis in the color space.

* * * * *